June 21, 1927.
B. L. JEFFERS
1,632,972
PAN HOLDER
Filed Dec. 30, 1925
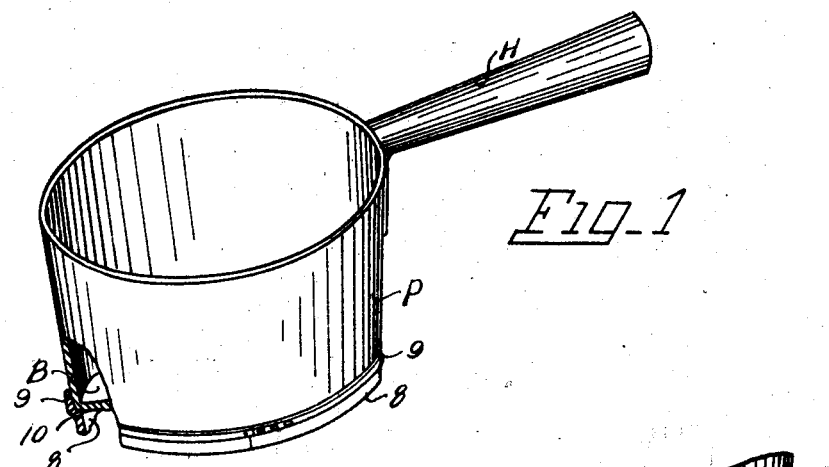
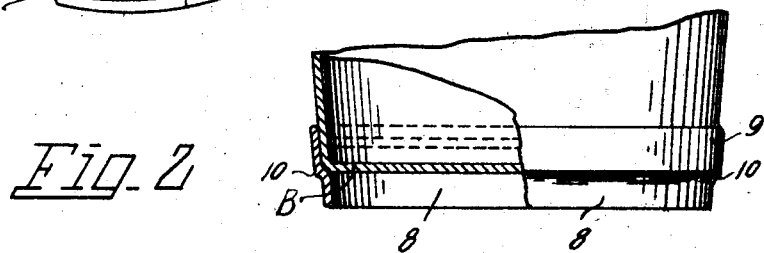
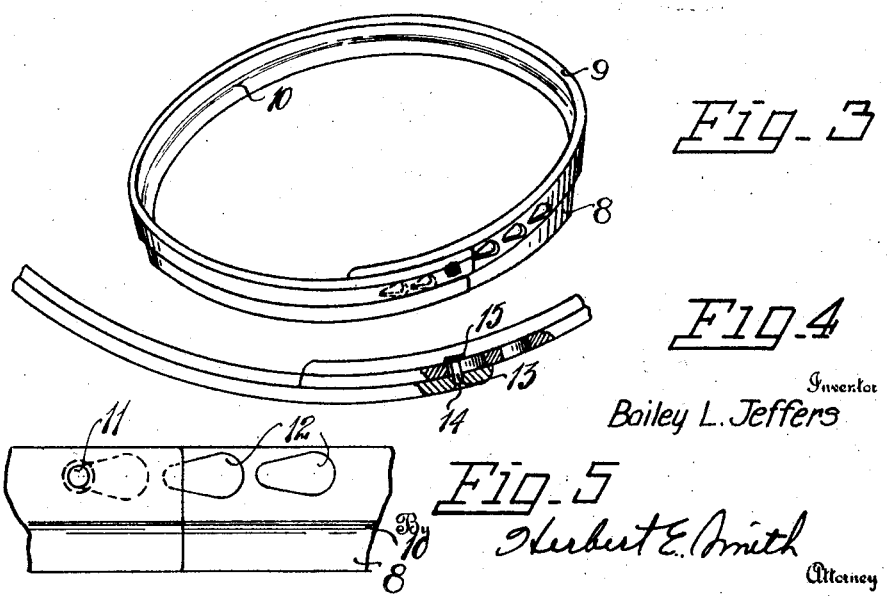
Inventor
Bailey L. Jeffers
By Herbert E. Smith
Attorney Patented June 21, 1927.

1,632,972

UNITED STATES PATENT OFFICE.

BAILEY L. JEFFERS, OF SPOKANE, WASHINGTON, ASSIGNOR OF ONE-HALF TO HORACE C. GAY, OF SPOKANE, WASHINGTON.

PAN HOLDER.

Application filed December 30, 1925. Serial No. 78,310.

My present invention relates to an improved pan holder for use on cooking stoves as a support for cooking vessels, as sauce pans, stew pans and similar culinary vessels. The primary object of the invention is the provision of means for protecting the vessel and its contents from excessive heat and this purpose is accomplished by furnishing an air space between the bottom of the vessel and the top of the stove. The air space is formed by the utilization of an open bottom holder in which the pan may be seated and the holder is constructed in such manner as to be readily adjustable for various sizes of pans.

While the holder may be fashioned in various sizes and shapes I have herein exemplified the device as circular and adapted to receive and support vessels having flat bottoms and round or circular bodies.

In the preferred form of the invention as illustrated in the drawings I have shown several exemplifications of the physical embodiment of my invention constructed according to the best modes I have thus far devised for the practical application of the principles of my invention.

Figure 1 is a perspective view partly broken away for convenience of illustration showing a holder as affixed on the lower portion of a sauce pan.

Figure 2 is an enlarged fragmentary view partly in section illustrating the holder.

Figure 3 is a perspective view of the holder.

Figure 4 is a sectional view at the overlapping ends of the holder.

Figure 5 is a detail view in side elevation of the overlapping ends of the holder.

In order that the general arrangement and utility of the device of my invention may readily be understood I have illustrated a conventional sauce pan P having a handle H and flat bottom B, the body of the pan being round as usual.

The holder is designed to support the pan a suitable distance above the top of the stove upon which it rests to prevent direct contact of the pan bottom with the stove top and thus eliminate excessive heat from the bottom of the pan and the contents of the pan.

The holder is adaptable to various sizes of pans being provided with means for adjustment. It is preferably made up of resilient or elastic metal and is divided so that its free ends overlap to permit increase or decrease in the diameter of the circular holder, and is fashioned with a base ring 8 and a flaring annular flange 9 larger in diameter than the ring, and also the annular supporting shoulder 10.

The free ends of the holder overlap, being maintained in alignment by the shoulder 10, and one end of the overlapping flange 9 is provided with a round pin hole 11 while the other free end of the flange is fashioned with a series or plurality of key-hole slots 12 arranged to register and selectively co-act with a pin 13 which is fixed in the hole 11.

The pin is secured in the hole 11 and is provided with a countersunk circular head 14 and a spaced retaining head 15. It will be seen that the larger end of the key-hole slot 12 is of a size to permit passage therethrough of the retaining head 15 while the smaller end of the slot is too small to pass the head. Thus when adjusting the holder to a desired diameter, with the ends overlapping, the retaining head is passed through the larger end of a slot and the holder permitted to expand to bring the pin to the smaller end of the slot where the parts are held by the resiliency or elasticity of the holder and the co-action of the pin and its retaining head and the wall of the slot.

In the manufacture of the invention the holder may be struck up, rolled out, or pressed from suitable metal blanks in appropriate machines to the desired shape and size, and may be applied for use with convenience and facility.

Having thus fully described my invention, what I claim as new and desire to secure by Letters Patent is—

A holder for cooking utensils comprising a split base ring the ends whereof are adapted to overlap, said ring having formed integral therewith an upstanding flange of a larger diameter than the ring, said ring at one overlapped end being provided with a pin extended inwardly thereof, the other of the overlapping ends of the ring being formed with a spaced series of key-hole slots adapted for reception of said pin to secure said holder about the bottom of the cooking utensil with the bottom resting within said flange on top of said ring.

In testimony whereof I affix my signature.

BAILEY L. JEFFERS.